United States Patent [19]

Nakai et al.

[11] Patent Number: 5,164,962
[45] Date of Patent: Nov. 17, 1992

[54] ADAPTIVE EQUALIZER WITH MIDBURST CORRECTION CAPABILITY

[75] Inventors: Toshihisa Nakai; Noriaki Kondoh, both of Tokyo, Japan

[73] Assignee: OKI Electric Industry Co., Ltd., Tokyo, Japan

[21] Appl. No.: 697,701

[22] Filed: May 9, 1991

[30] Foreign Application Priority Data

May 16, 1990 [JP] Japan ............................... 2-124136

[51] Int. Cl.$^5$ ............................................. H04L 27/01
[52] U.S. Cl. ...................................... 375/13; 333/18; 375/14; 375/101
[58] Field of Search .............. 375/12, 13, 14, 27, 375/56, 101; 333/18, 26; 364/724.2

[56] References Cited

U.S. PATENT DOCUMENTS

| 4,483,009 | 11/1984 | Honda et al. | 375/14 |
| 4,674,103 | 6/1987 | Chevillat et al. | 375/13 |
| 4,965,969 | 9/1987 | Sollenberger | 375/13 |
| 5,058,130 | 10/1991 | Park | 375/12 |

OTHER PUBLICATIONS

John G. Proakis, *Digital Communications*, Mc-Graw-Hill 1989 pp. 554-573.

*Primary Examiner*—Benedict V. Safourek
*Attorney, Agent, or Firm*—Edward D. Manzo

[57] ABSTRACT

An adaptive equalizer in a digital receiver filters differentially encoded data bursts containing known data preceded and followed by user data. A storage means saves and restores filter coefficients and other values so that the known data can be filtered repeatedly. As the known data are repeatedly filtered, a known-data generating means generates different differential encodings of the known data as desired data which are compared with the filtered values to obtain error values for use in updating the filter coefficients. A comparator means selects the encoding that produces the smallest cumulative error. The known data are then filtered once more, using the selected encoding as desired data, after which adaptive filtering of user data continues.

24 Claims, 5 Drawing Sheets

ADAPTIVE EQUALIZER WITH MIDBURST CORRECTION CAPABILITY

BACKGROUND OF THE INVENTION

This invention relates to an adaptive equalizer for reducing intersymbol interference in digital communication apparatus that receives differentially encoded data.

Differentially encoded binary phase-shift keying (BPSK) and quadrature phase-shift keying (QPSK) are widely used in cellular radio systems for communication between a base station and mobile stations such as automobile-mounted telephones. The mobile receiver generally includes an equalizer: a digital filter that compensates for transmitter filtering and channel conditions.

Cellular communication is performed on a time-division multiple-access basis and takes place in a series of short bursts. A burst commences with the transmission of fixed training data to enable the equalizer to adapt its filter coefficients, then continues with user data, during the reception of which the equalizer further adapts its filter coefficients to track channel variations.

The equalizer can adapt to gradual channel variations, but cannot follow abrupt changes. When such abrupt changes occur, the equalizer may lose track of the channel condition. If the equalizer wanders too far from the correct channel condition, received data values will be in error.

One way to reduce such errors is to perform a midburst correction using known data, such as a color code occurring at a fixed intermediate location in the user data. Due to the phase ambiguity of differential encoding, however, the receiver cannot tell which of the possible encodings of the known data to employ as desired data for the midburst correction. For this reason, existing adaptive equalizers have been unable to take advantage of known data occurring midway through a burst.

SUMMARY OF THE INVENTION

It is accordingly an object of the present invention to make use of known data occurring at an intermediate point in a differentially encoded data burst to correct the filter coefficients of an adaptive equalizer.

An adaptive equalizer has adaptive filter means for filtering sample values according to certain coefficients, thus producing a filtered value, then updating the coefficients according to an error value. A detector means detects the filtered value to produce a symbol value, which is the output of the adaptive equalizer.

The error value is generated by an error feedback means as the difference between the filtered value and a desired value. During reception of user data, the symbol value is the desired value.

Prior to reception of known data embedded in the user data, a storage means saves the internal state of the adaptive filter means. When the known data are received they are placed in the storage means, then repeatedly supplied to the adaptive filtered means and filtered, starting from the internal state saved in the storage means. During this time, a known-data generating means produces different differential encodings of the known data as desired data.

An accumulator means adds the error values to produce a cumulative error value for each differential encoding. A comparator means compares the cumulative errors and directs the known-data generating means to generate the differential encoding that produced the least cumulative error once again, so that the filter coefficients can be adapted to the optimum values. Reception of user data then continues.

DETAILED DESCRIPTION OF THE INVENTION

Figure 1:
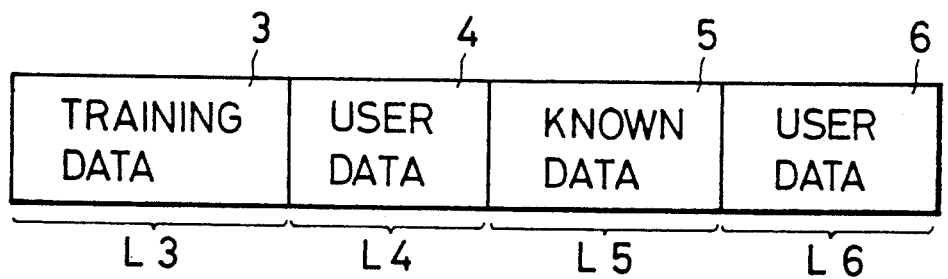
FIG. 1 illustrates a data burst having known data at an intermediate location.

FIG. 1 illustrates the structure of a data burst of the type used, for example, in time-division multiple-access cellular communications systems. The burst begins with a training field 3 consisting of a certain number (L3) of predetermined symbols. The number of symbols in a field will be referred to hereinafter as the length of the field.

A symbol represents one or more logic values, depending on the type of modulation employed. In BPSK modulation, for example, a symbol represents the logic value 0 or 1. In QPSK modulation a symbol represents 00, 01, 10, or 11.

The training field 3 is followed by a first user data field 4 of length L4, then a known data field 5 of length L5, then a second user data field 6 of length L6. The two user data fields 4 and 6 contain, for example, a brief interval of digitally encoded speech in a telephone call. The known data field 5 contains, for example, a color code used to discriminate bursts from different cells employing the same frequency. The color code is received from the base station at the beginning of a call and remains fixed throughout the call.

Next a general description of the invented adaptive equalizer will be given with reference to FIG. 2. It should be understood that FIG. 2 and the other attached drawings do not restrict the scope of the invention, which should be determined solely from the appended claims.

Figure 2:
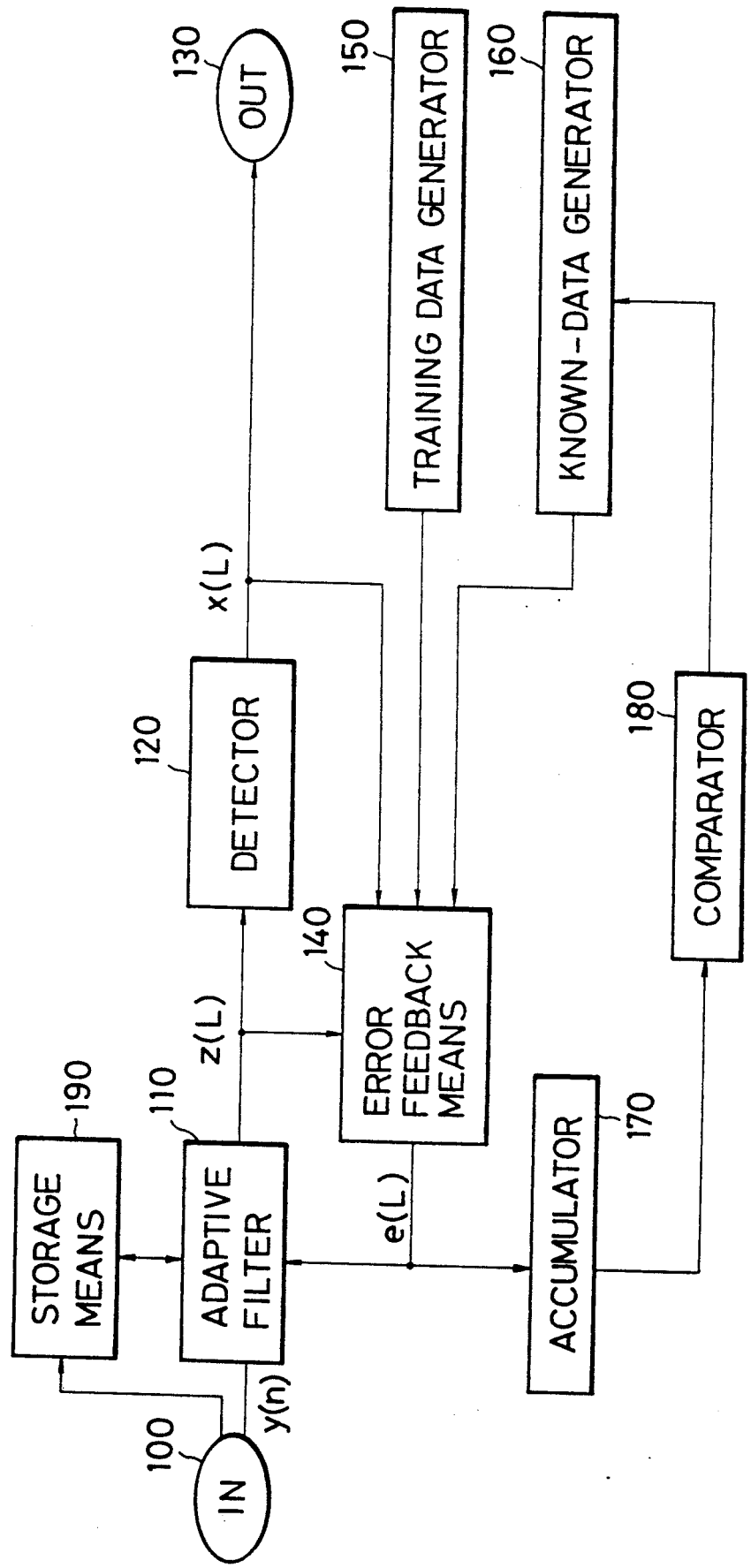
FIG. 2 is a general block diagram of the invented adaptive equalizer.

The adaptive equalizer in FIG. 2 comprises an input means 100 for input of sample values y(n) that have been obtained, for example, by demodulating a signal received at an antenna and passing the demodulated signal through an analog-to-digital converter. The sample values are accordingly digital values comprising, for example, sixteen bits each, all data paths shown in FIG. 2 being sixteen bits wide in this case. The sample rate is the same as the data rate, one sample covering the time span of one symbol, but due to intersymbol interference, the information in a symbol is spread over a plurality of consecutive samples.

The sample values are supplied from the input means 100 to an adaptive filter means 110 that performs a filtering operation using coefficients $C_i$ to obtain a filtered value $z(L)$. The operation that produces $z(L)$ involves a plurality of values such as sample values y(L+N) to y(L−M), where N≦0 and M>0. The effect of filtering is to reduce intersymbol interference, so that substantially all of the information in a single symbol is contained in a single filtered value z(L). After calculating z(L), the adaptive filter means 110 updates the coefficients $C_i$ in preparation for the next filtering operation.

The filtered value z(L) is passed to a detector means 120 that performs a thresholding operation to produce a symbol value x(L). While the filtered value z(L) has a substantially continuous range of values, the symbol value x(L) can take on only certain specific values in this range, such as the values +1 and −1 when BPSK modulation is used. In general, the detector means 120 generates the symbol value closest to the filtered value z(L). The symbol value x(L) is sent to an output means 130 such as a data bus, to undergo further digital processing by external devices not shown in the drawings.

The filtered value z(L) is also furnished to an error feedback means 140 which subtracts a desired value to produce an error value e(L). The symbol value x(L) can be supplied to the error feedback means 140 as the desired value, or other desired values can be used as described below. The error value e(L) is returned to the adaptive filter means 110 for use in updating the coefficients $C_i$.

The adaptive equalizer further comprises a training-data generating means 150 such as a memory device in which a sequence of training symbols is stored for provision to the feedback means 140 as desired values.

The adaptive equalizer also has a known-data generating means 160 which generates all possible differential encodings of the known data field 5 in FIG. 1, for provision to the feedback means 140 as desired values. The known-data generating means 160 may comprise a register or memory device in which the known data are stored and a computing device for differentially encoding the known data and producing different encodings as required. Alternatively, the known-data generating means 160 may simply comprise memory means in which the different differential encodings are placed by an external computing device.

The error values e(L) generated by the error feedback means 140 can also be supplied to an accumulator means 170, which sums them to produce a cumulative error value. Cumulative error values calculated in this way are supplied to a comparator means 180 which compares them, determines which is smallest in absolute value, and directs the known-data generating means 160 to generate the corresponding differential encoding once again.

The adaptive equalizer also comprises a storage means 190 which is connected to the input means 100 and the adaptive filter means 110 and has four functions: saving the internal state of the adaptive filter means 110; restoring the adaptive filter means 110 to the saved internal state; storing input sample values y(n); and repeatedly supplying the stored sample values to the adaptive filter means 110.

Next the operation of the adaptive equalizer will be described, again with reference to FIGS. 1 and 2.

During reception of the training field 3 in FIG. 1, the sample values y(n) received at the input means 100 are supplied to the adaptive filter means 110 and filtered, and the resulting filtered values z(L) are sent to the error feedback means 140. From these filtered values the error feedback means 140 subtracts the symbol data supplied by training-data generating means 150 to generate error values e(L). These are returned to the adaptive filter means 110 and used to update the coefficients $C_i$. By the end of the training field 3, the coefficients have become adapted to current channel conditions and equalization is being performed accurately.

During reception of the first user data field 4 in FIG. 1, the received sample values y(n) are filtered by the adaptive filter means 110, and the filtered values z(L) are detected by the detector means 120 to produce symbol values x(L). These symbol values are furnished as output to the output means 130, and as desired values to the error feedback means 140. The adaptive filter means 110 updates the coefficients $C_i$ on the basis of the error values e(L), where e(L)=z(L)−x(L). At the end of reception of the first user data field 4, the storage means 190 stores the current state of the adaptive filter means 110.

During reception of the known data field 5, the sample values y(n) are not supplied from the input means 100 to the adaptive filter means 110, but are instead stored in the storage means 190. Then the following operation is carried out once for each differential encoding of the known data: the accumulator means 170 is cleared to zero; the sample values y(n) stored in the storage means 190 are sent to the adaptive filter means 110 and filtered; the resulting filtered values z(L) are sent to the error feedback means 140, which subtracts the encoded symbol values supplied by the known-data generating means 160 to generate error values e(L); the error values e(L) are returned to the adaptive filter means 110 and used to update the coefficients $C_i$; and the error values e(L) are summed in the accumulator means 170. Each time this operation is completed, the cumulative error value in the accumulator means 170 is transferred to the comparator means 180 and stored, and the adaptive filter means 110 is restored to the state saved in the storage means 190.

When this operation has been completed for every differential encoding of the known data field 5, the comparator means 180 determines which encoding produced the smallest cumulative error. Then the known-data generating means 160 supplies that encoding to the error feedback means 140 as desired values while the sample values y(n) stored in the storage means 190 are once again sent to the adaptive filter means 110 and filtered. As before, the error feedback means 140 produces error values e(L), on the basis of which the adaptive filter means 110 updates the coefficients $C_i$. In addition, the filtered values z(L) are detected and the resulting symbol values x(L) are sent as output to output means 130. When the adaptive equalizer has output the last symbol value x(L) in the known data field 5, the adaptive filter means 110 remains in its current state, retaining the last updated values of the coefficients $C_i$.

In this way, the adaptive equalizer finds the differential encoding of the known data field 5 that best fits the sample values actually received, and uses that encoding as desired values to re-adjust the coefficients $C_i$. Accordingly, even if the adaptive equalizer had lost track of channel conditions during reception of the first user data field 4, it is able to recover during the known data field 5 and resume correct equalization.

During reception of the second user data field 6, the adaptive equalizer operates in the same way as during reception of the first user data field 4.

Symbol values are thus output for the first user data field 4, the known data field 5, and the second user data field 6. If the symbol values x(L) output for the known data field 5 match the known data correctly, the burst is assumed to be valid and the user data can be further processed. If the symbol values x(L) output for the known data field 5 do not match the known data, the burst is assumed to be invalid, belonging to a call in a different cell for example, and the user data can be ignored.

Next two more detailed embodiments of the invention will be described, the first suitable for BPSK modulation and the second suitable for QPSK modulation. The two embodiments are substantially identical with respect to the input means 100, the adaptive filter means 110, and the storage means 190, which will be illustrated for both embodiments in FIG. 3. The other components will be illustrated separately for the two embodiments in FIGS. 4 and 5.

Figure 3:
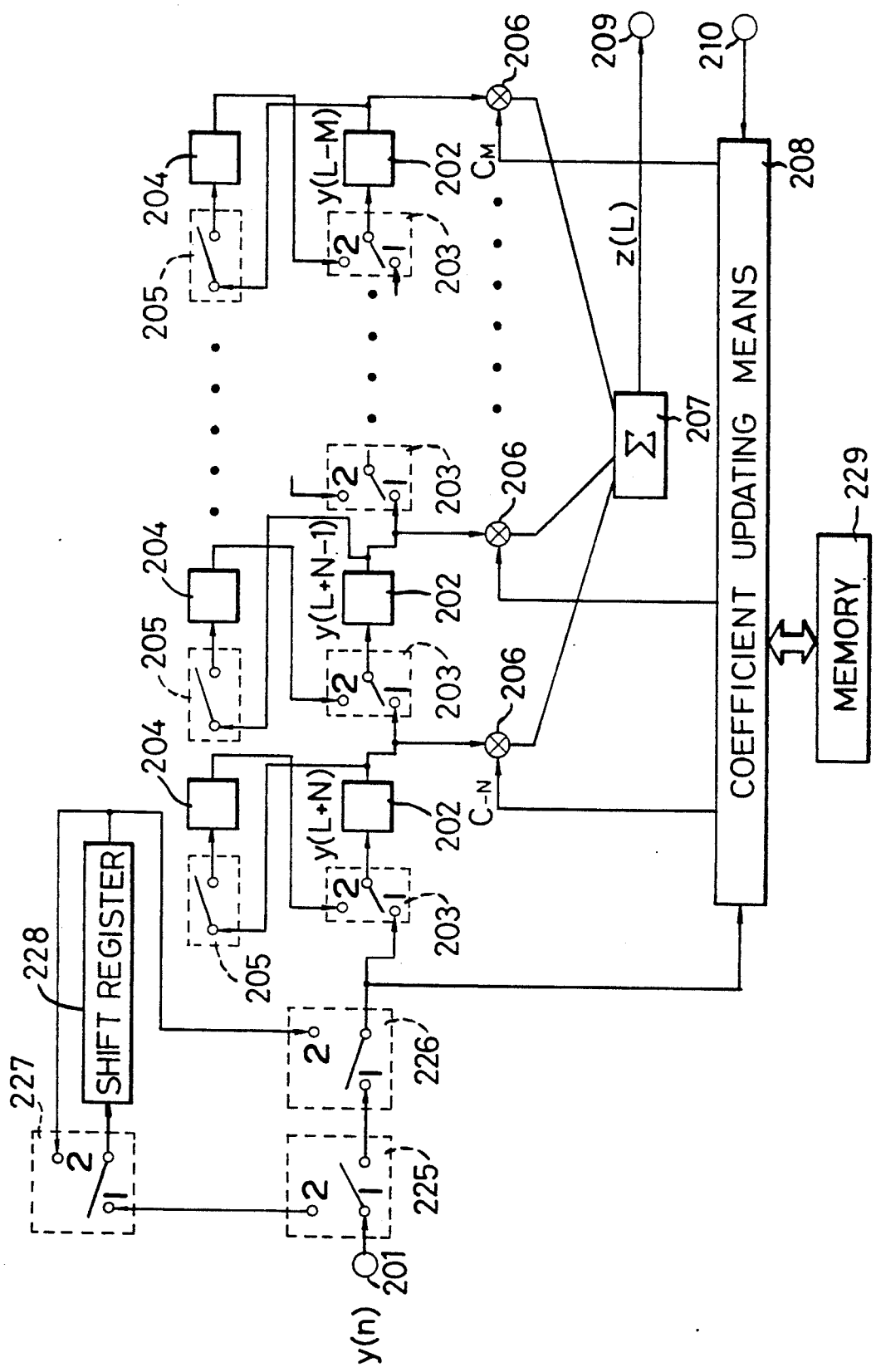
FIG. 3 is a more detailed block diagram of the input means, adaptive filter, and storage means in FIG. 2.

Referring to FIG. 3, sample values y(n) are received at an input bus 201 and fed via switches (described later) to a first shift register 202 having $M+N+1$ stages, where $M>0$ and $N \leq 0$ as before. Each stage is indicated by a square box in the drawing and is capable of holding one sample value y(n) comprising, for example, sixteen bits.

Between each pair of adjacent stages in the first shift register 202 is a switch 203 having two inputs and one output. The output of each switch 203 feeds the next stage of the first shift register 202. The first input (1) of each switch 203 is connected to the output side of the preceding stage of the first shift register 202. The second input (2) of each switch 203 is connected to a storage register 204. The first stage of the first shift register 202 is also preceded by a switch 203, the first input (1) of which is connected (via switches described later) to the input bus 201.

The storage register 204 resembles the first shift register 202 in having $M+N+1$ stages, each capable of holding one sample value y(n). The output side of each stage of the storage register 204 is connected to the second input (2) of the switch 203 preceding the corresponding stage of the first shift register 202.

The input side of each stage of the storage register 204 is connected to the output side of a switch 205 having just one input and one output. The input of the switch 205 is connected to the output side of the corresponding stage of the first shift register 202.

The adaptive equalizer also comprises $M+N+1$ multipliers 206, one for each stage of the first shift register 202. Each multiplier 206 receives the sample value y(n) stored in the corresponding stage of the first shift register 202, multiplies it by a coefficient, and supplies the resulting product to an adding means 207. The coefficients are denoted $C_{-N}$ to $C_M$ in the drawing.

The coefficients $C_{-N}$ to $C_M$ are supplied to the multipliers 206 from a coefficient updating means 208. The coefficient updating means 208 is, for example, a digital signal processor with various internal registers, not explicitly shown in the drawing, for storing values used in calculating the coefficients.

The adding means 207 adds the products received from the multipliers 206 and supplies their sum as the filtered value z(L) to a first node 209. The function of the first node 209 is simply to connect the adding means 207 in FIG. 3 to components that will be shown in FIG. 4 or 5. A second node 210 similarly connects the coefficient updating means 208 to components in FIG. 4 or 5.

Figure 4:
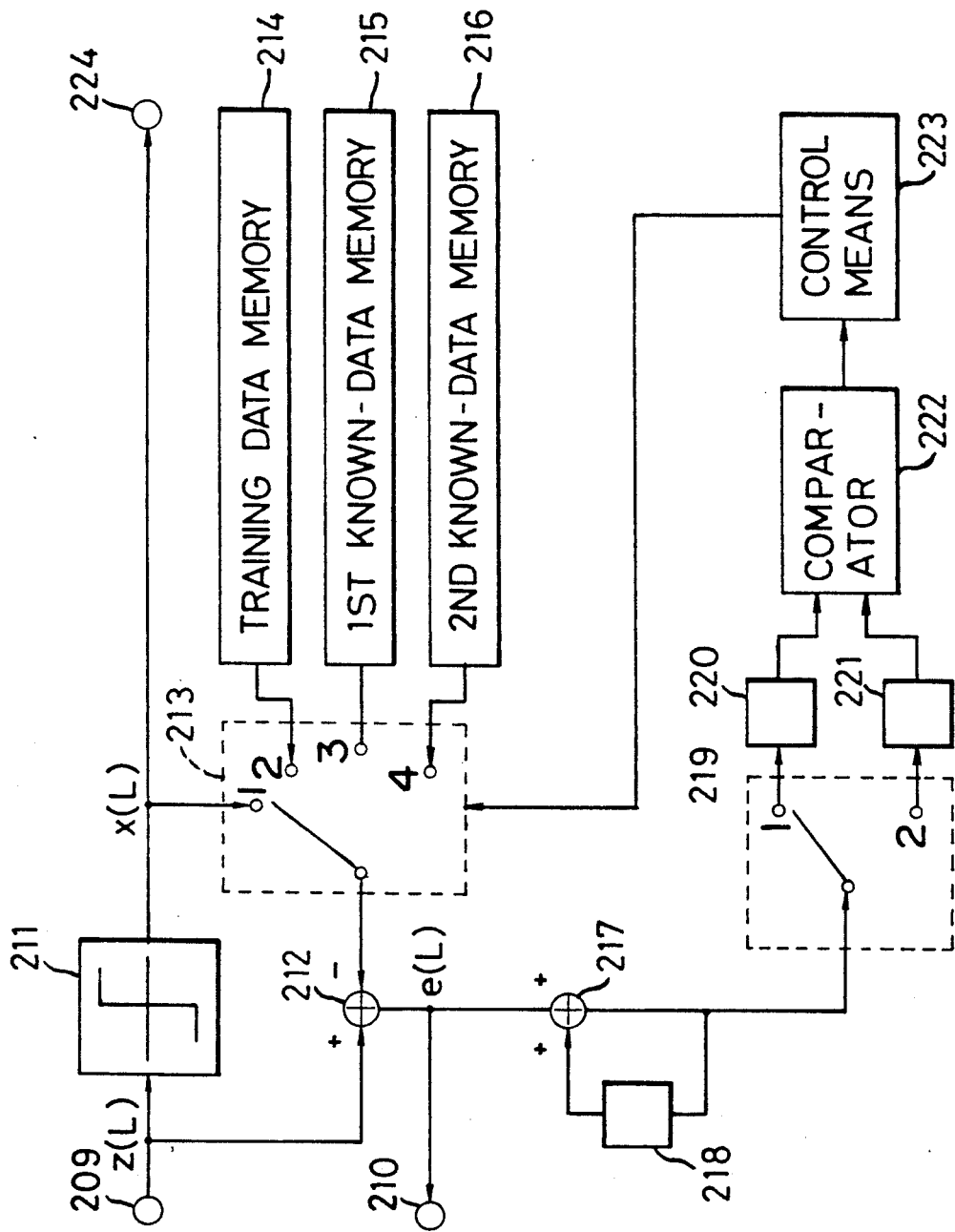
FIG. 4 is a more detailed block diagram of other components shown in FIG. 2 in a first embodiment of the invention.

Referring now to FIG. 4, which pertains to the first embodiment, the filtered value z(L) is supplied from the first node 209 to a sign detector 211 and a subtractor 212. The sign detector 211 generates a symbol value x(L) of $+1$ or $-1$ according to whether the sign of the filtered value z(L) is positive or negative.

The symbol value x(L) is fed to the first input (1) of a switch 213 having four inputs and one output. The output of the switch 213 is supplied as a desired value to the subtractor 212, which subtracts the desired value from the filtered value z(L) received from the first node 209 to produce an error value e(L).

The second input (2) of the switch 213 is connected to a training data memory 214 in which is stored a copy of the training field 3 in FIG. 1. The third input (3) of the switch 213 is connected to a first known-data memory 215, in which is stored a differentially encoded copy of the known data field 5 in FIG. 1. The fourth input (4) of the switch 213 is connected to a second known-data memory 216, in which is stored the opposite differential encoding of the known data field 5. That is, the values stored in the first and second known-data memories 215 and 216 have opposite signs. For example, if the known data field 5 is $$[+1, -1, +1, +1, +1, -1, -1],$$

then the encoded value stored in the first known-data memory 215 could be $$[+1, -1, -1, -1, -1, +1, -1],$$

in which case the opposite encoded value stored in the second known-data memory 216 is $$[-1, +1, +1, +1, +1, -1, +1].$$

These values are placed in the first and second known-data memories 215 and 216 at the beginning of a call, for example, and remain unchanged for the duration of the call.

The error value e(L) produced by the subtractor 212 is supplied to the second node 210 for return to the coefficient updating means 208 in FIG. 3, and is also supplied to an adder 217. The adder 217 adds the error value e(L) to the contents of an error accumulator 218, and places the resulting sum in the error accumulator 218.

The output of the error accumulator 218 is supplied to a switch 219 having one input and two outputs. The first output (1) of the switch 219 is connected to a first error memory 220; the second output (2) is connected to a second error memory 221. The values stored in the first and second error memories 220 and 221 are both supplied as inputs to a comparator 222, which compares them, determines which is smaller in absolute value, and notifies a control means 223. The control means 223 controls the switch 213.

The symbol value x(L) output by the sign detector 211 is supplied to an output bus 224 as the final output of the adaptive equalizer.

Referring again to FIG. 3, the adaptive equalizer also comprises a switch 225 having one input and two outputs, a switch 226 and a switch 227 each having two inputs and one output, and a second shift register 228. The second shift register 228 has L5 stages and can store L5 sample values. There are no switches between stages of the second shift register 228.

The input of the switch 225 is connected to the input bus 201. The first output (1) of the switch 225 is connected to the first input (1) of the switch 226. The second output of the switch 225 is connected to the first input (1) of the switch 227. The output of the switch 227 is fed as input to the first stage of the second shift register 228. The output from the last stage of the second shift register 228 is supplied to the second input (2) of the switch 226 and the second input (2) of the switch 227. The output of the switch 226 is supplied to the switch 203 preceding the first stage of the first shift register 202.

The adaptive equalizer further comprises a memory 229 for saving and restoring the internal state of the coefficient updating means 208.

The registers, memories and other components in FIGS. 3 and 4 are well-known microelectronic circuits, detailed descriptions of which will be omitted.

Relating FIG. 2 to FIG. 3, the input means 100 in FIG. 2 comprises the input bus 201 and the switch 225 in FIG. 3. The adaptive filter means 110 in FIG. 2 comprises the first shift register 202, the switches 203, the multipliers 206, the adding means 207, the coefficient updating means 208, and the switch 226 in FIG. 3. The storage means 190 in FIG. 2 comprises the storage register 204, the switches 205, the switch 227, the second shift register 228, and the memory 229 in FIG. 3.

Relating FIG. 2 to FIG. 4, the detector means 120 in FIG. 2 comprises the sign detector 211 in FIG. 4. The output means 130 in FIG. 2 comprises the output bus 224 in FIG. 4. The error feedback means 140 in FIG. 2 comprises the subtractor 212 and switch 213 in FIG. 4. The training-data generating means 150 in FIG. 2 comprises the training data memory 214 in FIG. 4. The known-data generating means 160 in FIG. 2 comprises the first and second known-data memories 215 and 216 in FIG. 4. The accumulator means 170 in FIG. 2 comprises the adder 217 and error accumulator 218 in FIG. 4. The comparator means 180 in FIG. 2 comprises the switch 219, the first and second error memories 220 and 221, the comparator 222, and the control means 223 in FIG. 4.

Details of the operation of the embodiment shown in FIGS. 3 and 4 in processing the data burst shown in FIG. 1 will be explained next.

Before the operation begins, the first shift register 202 and the internal registers of the coefficient updating means 208 are initialized to values such as zero, all $M+N+1$ switches 203 are set to the first position (1), the switch 213 is set to the second position (2), and the switches 225 and 226 are both set to the first position (1).

The first N sample values are then input from the input bus 201, routed through the switches 225 and 226 and the first switch 203, and provided to the first stage of the first shift register 202 and the coefficient updating means 208. As each sample value is input, the contents of each stage of the first shift register 202 are shifted into the next stage. After input of the first N sample values, the first N stages of the first shift register 202 thus hold $y(N), \ldots, y(1)$, and the other stages still hold the initial value (e.g. zero). The adaptive equalizer is now ready to begin receiving the training field 3 in FIG. 1.

Next, the sample values $y(N+1)$ to $y(N+L3)$ are input from the input bus 201 and shifted through the first shift register 202 in the same way as above. In addition, after each sample value $y(n)$ has been input and the contents of the first shift register 202 have been shifted, the following adaptive filtering process is performed.

First, the multipliers 206 multiply the contents of the first shift register 202 by coefficients $C_i$ ($i=-N$ to $M$), and the adding means 207 adds the resulting products to obtain a filtered value $z(L)$. Using $C_i(L-1)$ to denote the value to which the coefficient $C_i$ was updated after generation of the previous filtered value $z(L-1)$, the filtered value $z(L)$ can be expressed as follows:

$$z(L) = \sum_{i=-N}^{i=M} C_i(L-1)y(L-i)$$

The filtered value $z(L)$ is fed through the first node 209 to the subtractor 212, which subtracts from it the value selected by the switch 213, this being the L-th training symbol value obtained from the training data memory 214. The resulting error value $e(L)$ is returned through the second node 210 to the coefficient updating means 208, which next executes a predetermined algorithm to update the coefficients $C_i(L-1)$, thereby creating a new set of coefficients $C_i(L)$.

Various updating algorithms are possible; the well-known recursive least squares (RLS) algorithm will be described here. The coefficients $C_i$ will be represented collectively as a column vector $c(L)$, the sample values multiplied by these coefficients will be represented as a column vector $q(L)$, and a superscript T will denote the corresponding row vectors, thus:

$$c^T(L) = [C_{-N}(L), C_{-N+1}(L), \ldots, C_0(L), \ldots, C_M(L)]$$

$$q(L) = [y(L+N), y(L+N-1), \ldots, y(L), \ldots, y(L-M)]$$

Letting $k(L)$ be a further column vector and $P(L)$ be an $(M+N+1)\times(N+M+1)$ matrix, the RLS algorithm can be written as follows:

$$c(L) = c(L-1) + k(L)e(L)$$
$$k(L) = P(L-1)q(L)\{1 + q^T(L)P(L-1)q(L)\}^{-1}$$
$$P(L) = P(L-1) - k(L)q^T(L)P(L-1)$$

The coefficients $c(L)$ determined in this way are used to calculate the next filtered value $z(L+1)$.

When the sample value $y(N+L3)$ has been input and the coefficients $C_i(L3)$ calculated as above, the switch 213 is set to the first position (1) and reception of the first user data field 4 begins.

Now the sample values $y(N+L3+1)$ to $y(N+L3+L4)$ are input and shifted through the first shift register 202 as before. After input of each sample value, the adaptive filtering process described above is carried out to obtain a filtered value $z(L)$ and new filter coefficients $C_i(L)$. In addition, the sign detector 211 detects the filtered value $z(L)$ to determine a symbol value $x(L)$, which is output at the output bus 224. As desired values, the swich 213 now selects the symbol values $x(L)$ output by the sign detector 211.

When the sample value $y(N+L3+L4)$ has been input, the symbol value $x(L3+L4)$ obtained, and the coefficients updated to $C_i(L3+L4)$ ($i=-N$ to $M$), the internal state of the adaptive filter is saved as follows in preparation for reception of the known data field 5 in FIG. 1. All the switches 205 are closed, the contents of the first shift register 202 are transferred to the storage register 204, then the switches 205 are opened again. In addition, data used in the updating algorithm, such as the vector $c(L3+L4)$ and matrix $P(L3+L4)$, are transferred to the memory 229.

The switch 225 is now set to the second position (2), the switch 227 is set to the first position (1), and the sample values y(N+L3+L4+1) to y(N+L3+L4+L5) are routed from the input bus 201 into the second shift register 228. When y(N+L3+L4+L5) has been stored in the second shift register 228, the switches 226 and 227 are both set to the second position (2). At this instant, the rightmost sample value stored in the second shift register 228 is y(N+L3+L4+1), and the leftmost sample value is y(N+L3+L4+L5).

Next the error accumulator 218 in FIG. 4 is cleared to zero, the switch 219 is set to the first position (1), the switch 213 is set to the third position (3), and the following operation is repeated L5 times.

First, the rightmost value in the second shift register 228 is fed through switches 226 and 203 to the first stage of the first shift register 202, and the contents the first shift register 202 are shifted right. In addition, the second shift register 228 is rotated to the right: the contents of each stage are shifted right, and the contents of the rightmost stage are sent through the switch 227 to the leftmost stage.

Next, adaptive filtering is executed as described above to obtain a filtered value z(L3+L4+K), where K is an integer from 1 to L5. This filtered value is supplied through the first node 209 to the subtractor 212, which subtracts from it the K-th value stored in the first known-data memory 215. The difference e(L3+L4+K) is output through the second node 210 to the coefficient updating means 208 and used to update the coefficients $C_i$ as explained above. The difference e(L3+L4+K) is also input to the adder 217 and added to the contents of the error accumulator 218, the sum being stored in the error accumulator 218.

After the preceding operation has been repeated L5 times, the memory error accumulator 218 contains the sum of the L5 error values from e(L3+L4+1) to e(L3+L4+L5). This cumulative sum is stored via the switch 219 in the first error memory 220. The second shift register 228, having been rotated L5 times, is back at its original state with y(N+L3+L4+1) in the rightmost position and y(N+L3+L4+L5) in the leftmost position.

Next the following operations are carried out to restore other registers to their original contents. First, the switches 203 are set to the second positions (2) and the contents of the storage register 204 are transferred to the first shift register 202. When this transfer is completed, the switches 203 are reset to the first positions (1). In addition, the error accumulator 218 is reset to zero, and the values saved in the memory 229, such as the vector c(L3+L4) and matrix P(L3+L4), are transferred back to the coefficient updating means 208. The contents of the storage register 204 and the memory 229 are not changed by this restoration operation.

The switch 213 is now set to the fourth position (4), the switch 219 is set to the second position (2), and the same adaptive filtering and error accumulation processes are repeated another L5 times, again rotating the second shift register 228 and using the values from y(N+L3+L4+1) to y(N+L3+L4+L5). This time, the data in the second known-data memory 216 are subtracted as desired values from the filtered values by the subtractor 212. At the end, the cumulative error is stored in the second error memory 221.

Next, the comparator 222 compares the absolute values of the contents of the first error memory 220 and the second error memory 221 and notifies the control means 223 of the result. If the accumulated error value in the first error memory 220 is smaller, the control means 223 sets the switch 213 to the third position (3). If the accumulated error in the second error memory 221 is smaller, the switch 213 set to the fourth position (4).

Original register contents are now restored yet again. The switches 203 are set to the second position (2), the contents of the storage register 204 are transferred to the first shift register 202, the switches 203 are then reset to the first position (1), and the contents of the memory 229 are restored to the coefficient updating means 208.

The adaptive filtering is now carried out L5 times yet again, using the values from y(N+L3+L4+1) to y(N+L3+L4+L5) in the second shift register 228. This time each filtered value z(L) (L=L3+L4+1 to L3+L4+L5) is detected by the sign detector 211 and the resulting symbol value x(L) (+1 or −1) is provided as output at the output bus 224. The contents of the first or second known-data memory 215 or 216, depending on the position of the switch 213, are subtracted from z(L) to obtain the error e(L), which is fed back to the coefficient updating means 208 to update the coefficients $C_i$. This time the errors e(L) need not be accumulated.

When x(L3+L4+L5) has been output and e(L3+L4+L5) has been fed back to update the coefficients, next the switches 213, 225 and 226 are returned to their first positions (1), the switch 203 is left at its first position (1), and reception of the second user data field 6 in FIG. 1 begins.

During reception of the second user data field 6, sample values y(N+L3+L4+L5+1) to y(N+L3+L4+L5+L6) are input and processed in the same way as during reception of the first user data field 3, producing output of symbol values x(L3+L4+L5+1) to x(L3+L4+L5+L6).

Figure 5:
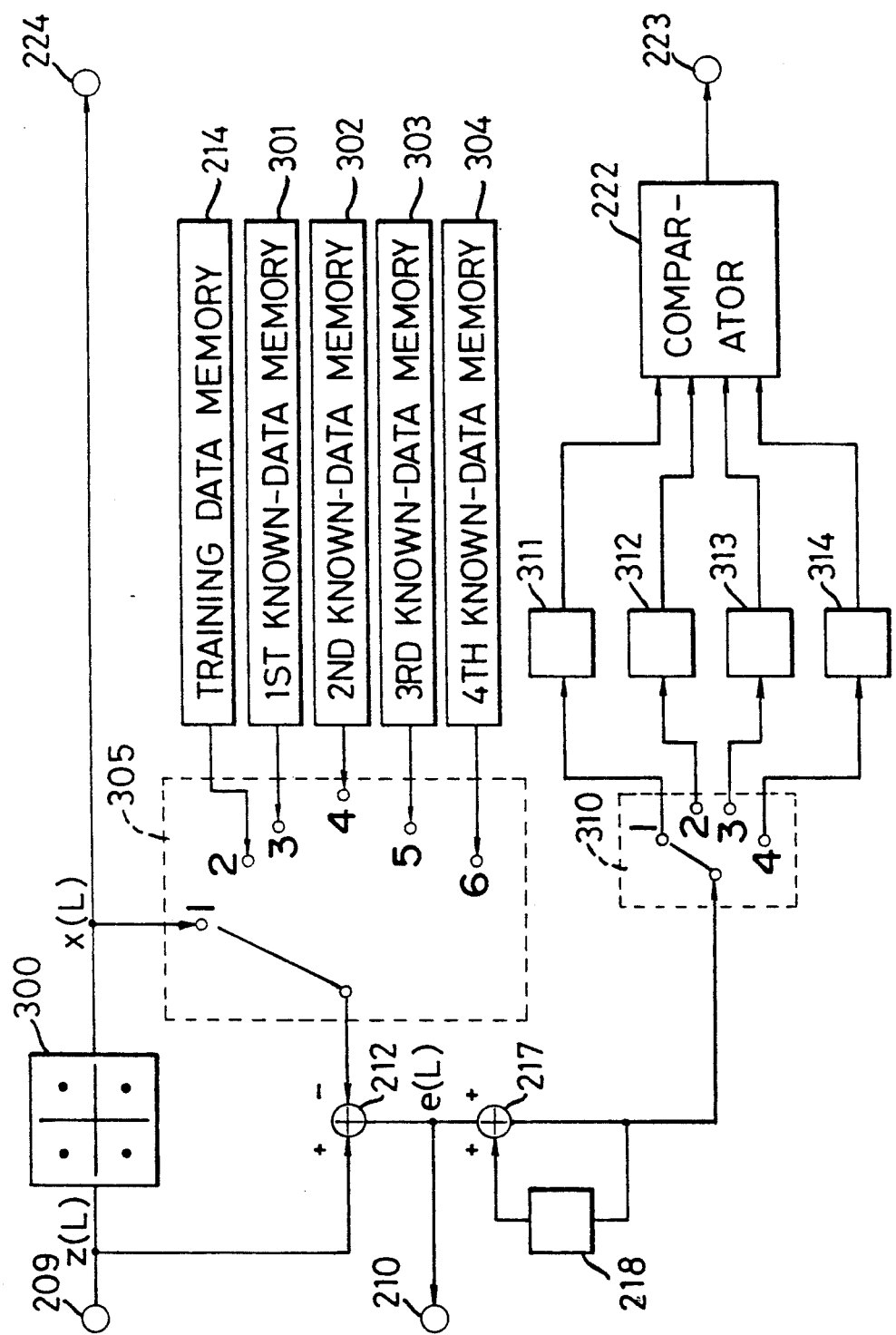
FIG. 5 is a more detailed block diagram of other components shown in FIG. 2 a second embodiment of the invention.

Next the second embodiment will be described with reference to FIG. 3 and FIG. 5. This embodiment is intended for use with differential QPSK, so the sample values and other values are complex numbers. The shift registers, multipliers, and other elements in FIG. 3 and FIG. 5 are all adapted to process complex numerical data. Each multiplier, for example, comprises four real multipliers and two real adders for performing operations of the form:

$$(a+bi)(c+di) = (ac-bd) + (ad+bc)i$$

Other than the difference between operating on complex instead of real numbers, the second embodiment is identical to the first embodiment in regard to the structures shown in FIG. 3.

Many of the structures in FIG. 5 are similarly identical to structures in FIG. 4, and are identified by the same reference numerals. The description of FIG. 5 will be confined to the differing elements.

The detector means in FIG. 5 is a quadrature detector 300 that produces one of four complex values such as $1+i$, $-1+i$, $-1-i$, and $1-i$. These values can be written as phase angles $\pi/4$, $3\pi/4$, $5\pi/4$, and $7\pi/4$.

The known-data generating means in FIG. 5 comprises four known-data memories 301, 302, 303, and 304. Prior to communication, the known data differentially encoded and stored in these memories with phase shifts of 0, $\pi/2$, $2\pi/2$, and $3\pi/2$, respectively. For example, using phase-angle notation, if the known data are $[0, \pi, \pi, 0, \pi, \pi, \pi,]$, then the first known-data memory 301 contains $[\pi/4, 5\pi/4, \pi/4, \pi/4, 5\pi/4, \pi/4, 5\pi/4[$, the second known-data memory 302 contains $[3\pi/4, 7\pi/4, 3\pi/4, 3\pi/4, 7\pi/4, 3\pi/4, 7\pi/4]$, the third known-data memory 303 contains $[5\pi/4, \pi/4, 5\pi/4, 5\pi/4, \pi/4, 5\pi/4, \pi/4]$, and fourth known-data memory 304 contains $[7\pi/4, 3\pi/4, 7\pi/4, 7\pi/4, 3\pi/4, 7\pi/4, 3\pi/4]$.

The error feedback means comprises a switch 305 that is similar to the switch 213 in FIG. 4 except that it now has six inputs numbered (1) to (6). The known-data memories 301, 302, 303, and 304 are connected to the third through sixth inputs (3) through (6).

The comparator means comprises a switch 310 that is similar to the switch 219 in FIG. 4 except that it now has four outputs numbered (1) to (4). These are connected to four error memories 311, 312, 313, and 314, the contents of which are compared by the comparator 222.

The second embodiment operates like the first embodiment during reception of the training field and the two user data fields. During reception of the known data, the sample values from $y(N+L3+L4+1)$ to $y(N+L3+L4+L5)$ stored in the second shift register 228 are rotated and supplied to the first shift register 202 five times. The first four times, the switch 305 is set to the third, fourth, fifth, and sixth positions and the switch 310 to the first, second, third, and fourth positions, respectively. The fifth time, the control means 223 sets switch 305 to whichever position gave the least absolute cumulative error, as determined by the comparator 222, and the switch 310 is not used. Further description of the operation of the second embodiment will be omitted since it is similar to the first embodiment.

In the same way that the inventive concept was extended from differential binary PSK in the first embodiment to differential quadrature PSK in the second embodiment, it can be extended to differential M-ary PSK, in which there are M possible symbol values differing in phase by increments of $2\pi/M$. In this case the switch in the error feedback means has M+2 inputs, the switch in the comparator means has M outputs, and during the midburst correction the filtered values z(L) are compared with M different differential encodings of the known data. (The integer M in this paragraph is unrelated to the integer M mentioned earlier.)

The invention can also be applied to adaptive equalizers using nonlinear filters instead of the linear filter shown in FIG. 3. For example, the invention is applicable to an adaptive decision feedback equalizer.

Many of the hardware elements shown in FIGS. 4 and 5, such as the switches, detectors, and elements that perform arithmetic operations, can be replaced by software. For example, the entire adaptive equalizer can be implemented compactly and at low cost using a suitably programmed digital signal processor with sufficient register and memory storage.

The error feedback means can subtract the filtered value z(L) from the desired value instead of vice versa, and various other modifications, which will be obvious to those skilled in the art, can be made without departing from the spirit and scope of the invention.

What is claimed is:

1. An adaptive equalizer for reducing intersymbol interference in a received burst of differentially encoded data having known data at an intermediate location in the burst, comprising:
   input means for receiving sample values;
   adaptive filter means, connected to said input means, for filtering said sample values according to certain coefficients to produce a filtered value, and updating said coefficients according to an error value;
   detector means, connected to said adaptive filter means, for detecting said filtered value and producing a symbol value;
   output means, connected to said detector means, for output of said symbol value;
   known-data generating means, for producing different differential encodings of said known data;
   error feedback means, connected to said adaptive filter means, said detector means, and said known-data generating means, for calculating said errore value as a difference between said filtered value and a desired value, said desired value being generated by said known-data generating means during reception of said known data;
   accumulator means, connected to said error feedback means, for summing said error values to produce, for each of said differential encodings, a cumulative error value for that differential encoding;
   comparator means, connected to said accumulator means and said known-data generating means, for finding a cumulative error with minimum absolute value and causing said known-data generating means to generate the corresponding differential encoding of said known data again; and
   storage means, connected to said input means and said adaptive filter, for saving an internal state of said adaptive filter means, receiving and storing sample values corresponding to said known data, then repeatedly restoring said adaptive filter means to the saved internal state and repeatedly supplying the stored sample values to said adaptive filter means.

2. The equalizer of claim 1, further comprising a training data generating means connected to said error feedback means, for generating training data.

3. The equalizer of claim 2, wherein said error feedback means comprises:
   switch means for selecting, as said desired value, said training data during an initial period of the burst, different differential encodings of said known data in turn during reception of said known data, and said symbol value at other times; and
   subtracting means, connected to said switch means, for substracting said desired value from said filtered value.

4. The equalizer of claim 1, wherein said known-data generating means computes different differential encodings of said known data and supplies said differential encodings to said error feedback means in turn.

5. The equalizer of claim 1, wherein said known-data generating means comprises memory means for storing different differential encodings of said known data.

6. The equalizer of claim 5, wherein said known-data generating means comprises two memory means for storing real values of opposite sign.

7. The equalizer of claim 5, wherein said known-data generating means comprises four memory means for storing complex values with respective phase shifts of 0, $\pi/2$, $2\pi/2$, and $3\pi/2$.

8. The equalizer of claim 1, wherein said accumulator means comprises:
an error accumulator; and
and adder for adding contents of said error accumulator to said error value to produce a sum, and placing said sum in said error accumulator.

9. The equalizer of claim 1, wherein said comparator means comprises:
a plurality of memory means for storing cumulative error values;
switch means for connecting said accumulator means to each of said plurality of memory means in turn;
a comparator, connected to said plurality of memory means, for comparing cumulative error values stored therein and finding a smallest cumulative error value; and
control means connected to said comparator and said known-data generating means, for causing said known-data generating means to generate an encoding that produced said smallest cumulative error value.

10. The equalizer of claim 1, wherein said storage means comprises:
a shift register for storing said sample values during reception of said known data, and shifting the stored sample values in a rotary fashion, sample values shifted out of said shift register being returned to said shift register, and also supplied to said adaptive filter means;
a storage register for saving sample values held in said adaptive filter means and repeatedly restoring the saved sample values to said adaptive filter means; and
a memory for saving said coefficients, and information used in updating said coefficients, and repeatedly restoring the saved coefficients and information to said adaptive filter means.

11. The equalizer of claim 1, wherein said adaptive filter means updates said coefficients according to a recursive least-squares algorithm.

12. An adaptive equalizer for reducing intersymbol interference in a received burst of differentially encoded data having known data at an intermediate location in the burst, comprising:
an input circuit coupled to receive sample values;
an adaptive filter circuit coupled to said input circuit and configured to filter the sample values according to coefficients to produce a filtered value, the adaptive filter circuit being effective to update the coefficients in accordance with an error value;
a detector coupled to said adaptive filter circuit to provide a symbol value;
a known data generator circuit configured to produce different differential encodings of the known data;
an error feedback calculating circuit coupled to said adaptive filter circuit, said detector, and said known data generator circuit, the calculating circuit being configured to calculate said error value as a difference between the filtered value and a desired value, the desired value being generated by the known data generator circuit;
an accumulator circuit coupled to said error feedback calculating circuit thereby to provide a cumulative error value for each of said different differential encodings;
a comparator circuit coupled to said accumulator circuit and the known data generator circuit, the comparator circuit being configured to find the said cumulative error with the smallest absolute value, the known data generator circuit being responsive to the comparator circuit to generate the corresponding differential encoding of the known data again;
a storage circuit coupled to said input circuit and said adaptive filter circuit, said storage circuit being configured to store sample values corresponding to known data and to restore the adaptive filter circuit to an internal state saved in said storage circuit, and to supply stored sample values to the adaptive filter circuit; and
an output path coupled to said detector.

13. The equalizer according to claim 12 further comprising a training data generating circuit coupled to said error feedback circuit, effective to produce training data; the error feedback calculating circuit including:
(a) a switch circuit effective to select as the desired data the training data during an initial period of the burst, different differential encodings of the known data successively during reception of the known data, and the symbol value at other times; and
(b) a subtractor circuit coupled to the switch for subtracting the desired value from the filtered value.

14. The equalizer according to claim 12 wherein said known data generator circuit is effective to determine different differential encodings of the known data and to supply said them successively to the error feedback calculating circuit.

15. The equalizer according to claim 12 wherein said known data generator circuit comprises at least one memory device capable of storing different differential encodings of the known data.

16. The equalizer according to claim 15 wherein said known data generator circuit stores real values of opposite sign.

17. The equalizer according to claim 15 wherein said known data generator circuit stores sets of complex values with respective phase shifts of 0, $\frac{1}{2}\pi$, $\pi$, and $1\frac{1}{2}\pi$.

18. The device according to claim 12 wherein said accumulator circuit comprises:
an error accumulator; and
an adder circuit coupled to said error accumulator and configured to add contents of the error accumulator to the error value to produce a sum, and place the sum in the error accumulator.

19. The device according to claim 12 wherein said comparator circuit comprises:
an error memory device capable of storing cumulative error values;
a switch coupling said accumulator circuit to receive successively the cumulative error values from the error memory device;
a comparator coupled to said error memory device and configured to find the smallest cumulative error value; and
a control circuit coupled to said comparator circuit and said known data generating circuit effective to cause the known data generating circuit to provide an encoding what produced the smallest cumulative error value.

20. The device according to claim 12 wherein said storage circuit comprises:
- a shift register coupled to store said sample values during reception of said known data;
- a storage register coupled to save sample values held in said adaptive filter circuit and to restore saved sample values to the adaptive filter circuit; and
- a memory device coupled to store said coefficients and to restore stored coefficient to the adaptive filter circuit.

21. The equalizer of claim 12 wherein said adaptive filter circuit updates said coefficients according to a recursive least-squares algorithm.

22. A method for adaptively equalizing and reducing intersymbol interference in a received burst of differentially encoded data having known data at an intermediate location in the burst, comprising the steps of:
- receiving sample values;
- filtering said sample values according to certain coefficients to produce a filtered value, and updating said coefficients according to an error value;
- detecting said filtered value and producing a symbol value;
- outputting said symbol value;
- producing different differential encodings of said known data;
- calculating said error value as a difference between said filtered value and a desired value, said desired value being generated during reception of said known data;
- summing said error values to produce for each of said differential encodings a respective cumulative error value;
- finding the cumulative error with lowest absolute value and generating the corresponding differential encoding of said known data again;
- saving an internal state for said filtering;
- receiving and storing sample values corresponding to said known data; then repeatedly restoring the saved internal state and repeatedly supplying said stored sample values for said filtering.

23. A method according to claim 22 further comprising the steps of generating training data and selecting as the desired value the training data during an initial part of the burst.

24. A method according to claim 22 further comprising the step of supplying said differential encodings for calculating said error value.

* * * * *